United States Patent
Henry et al.

(10) Patent No.: US 6,390,662 B1
(45) Date of Patent: May 21, 2002

(54) INTEGRATED CAKE AND PASTRY ICING AND DECORATING SYSTEM, WAND AND METHOD

(76) Inventors: Carolyn S. Henry; Jimmy Dale Henry, both of P.O. Box 7873, West Fork, AR (US) 72774

( * ) Notice: Subject to any disclaimer, the term of this patent is extended or adjusted under 35 U.S.C. 154(b) by 0 days.

(21) Appl. No.: 09/768,780

(22) Filed: Jan. 25, 2001

Related U.S. Application Data (60) Provisional application No. 60/178,701, filed on Jan. 28, 2000.

(51) Int. Cl.[7] .......................... B01F 15/02; B67D 5/60; A23G 3/28; B05C 5/02
(52) U.S. Cl. ................ 366/177.1; 366/181.6; 366/182.3; 222/132; 222/145.1; 99/353; 118/14; 118/24; 426/89
(58) Field of Search ................ 366/177.1, 181.6, 366/182.2, 182.1; 222/132, 145.1, 144.5, 145.5, 145.6, 145.7, 145.8; 118/24, 13, 14; 426/89; 99/353

(56) References Cited

U.S. PATENT DOCUMENTS

| | | | | |
|---|---|---|---|---|
| 3,168,967 A | * | 2/1965 | Giampa | 222/145.5 |
| 3,632,021 A | * | 1/1972 | MacManus | 222/190 |
| 3,751,198 A | | 8/1973 | Tanara | 425/100 |
| 3,773,225 A | * | 11/1973 | Repola | 222/144.5 |
| 3,814,285 A | * | 6/1974 | Craig | 222/144.5 |
| 3,863,810 A | * | 2/1975 | Hanson | 222/144.5 |
| 3,866,838 A | * | 2/1975 | Miles | 239/372 |
| 3,900,054 A | * | 8/1975 | Hamer et al. | 118/323 |
| 3,917,172 A | * | 11/1975 | O'Hare | 222/136 |
| 4,024,287 A | | 5/1977 | Golchert | 426/383 |
| 4,032,044 A | * | 6/1977 | Flynn et al. | 222/135 |
| 4,043,294 A | * | 8/1977 | Morine et al. | 118/25 |
| 4,061,248 A | * | 12/1977 | Arena | 222/145.5 |
| 4,124,147 A | * | 11/1978 | Priese et al. | 222/135 |
| 4,162,028 A | * | 7/1979 | Reichenberger | 222/144.5 |
| 4,163,523 A | * | 8/1979 | Vincent | 222/135 |
| 4,260,272 A | * | 4/1981 | Lebecque | 118/25 |
| 4,421,251 A | | 12/1983 | Namdari et al. | 222/99 |
| 4,477,003 A | * | 10/1984 | Baker et al. | 222/144.5 |
| 4,526,300 A | | 7/1985 | Woody | 222/146.5 |
| 4,531,292 A | * | 7/1985 | Pasternak | 33/18.1 |
| 4,881,663 A | * | 11/1989 | Seymour | 222/132 |
| 4,910,661 A | | 3/1990 | Barth et al. | 364/167.01 |
| 4,966,537 A | | 10/1990 | Bowles et al. | 425/87 |
| 5,035,907 A | | 7/1991 | Phillips et al. | 426/383 |
| 5,158,210 A | * | 10/1992 | Du | 222/144.5 |
| 5,361,946 A | | 11/1994 | Ginther et al. | 222/175 |
| 5,366,117 A | * | 11/1994 | Mesenbring et al. | 222/132 |
| 5,368,195 A | * | 11/1994 | Pleet et al. | 222/144.5 |
| 5,370,734 A | * | 12/1994 | Ferrero | 118/13 |
| 5,429,681 A | | 7/1995 | Mesenbring | 222/132 |
| 5,464,124 A | | 11/1995 | Weyh et al. | 222/129.1 |
| 5,480,664 A | * | 1/1996 | Ferrero | 118/13 |
| 5,505,775 A | * | 4/1996 | Kitos | 118/13 |
| 5,816,450 A | | 10/1998 | Alexander et al. | 222/179 |
| 5,924,599 A | * | 7/1999 | Brown | 222/135 |
| 5,951,766 A | | 9/1999 | Miller | 118/667 |
| 6,004,606 A | * | 12/1999 | French et al. | 426/89 |
| 6,058,843 A | * | 5/2000 | Young | 118/14 |
| 6,267,999 B1 | * | 7/2001 | Romer et al. | 118/24 |
| 6,268,000 B1 | * | 7/2001 | Romer | 118/24 |
| 6,312,740 B1 | * | 11/2001 | Roberts | 426/89 |
| 6,319,530 B1 | * | 11/2001 | Stewart | 426/87 |
| 6,322,242 B1 | * | 11/2001 | Lang et al. | 222/132 |

* cited by examiner

Primary Examiner—Tony G Soohoo
(74) Attorney, Agent, or Firm—Jim Zegeer (57) ABSTRACT

A cake and pastry decorating system incorporating a hand-held icing mixing wand having a mixing chamber and a dispensing nozzle. Base icing is supplied to the mixing chamber and one or more colorants are selectively supplied through a flexible hose to the mixing chamber. Icing is dispensed from the mixing chamber through the dispensing nozzle directly on the cake or pastry in patterns determined by the position of the hand-held icing mixing wand and shape of the dispensing nozzle.

19 Claims, 8 Drawing Sheets

INTEGRATED CAKE AND PASTRY ICING AND DECORATING SYSTEM, WAND AND METHOD

REFERENCE TO RELATED APPLICATION

The present application is the subject of my provisional patent application U.S. Ser. No. 60/178,701 filed Jan. 28, 2000 and entitled CAKE AND PASTRY INTEGRATED ICING AND DECORATING DEVICE.

BACKGROUND AND BRIEF DESCRIPTION OF THE INVENTION

This invention relates to an apparatus and method for preparing and dispensing icing for cakes wherein one or more of a plurality of colorants and a base icing are brought together in a mixing wand for preparing plain or colored icing. Methods and apparatus for dispensing cake icing are well known in the art, ranging from simple collapsible cones that are squeezed by the cake artisan to computerized automatic icing dispensers. The following U.S. patents are representative:

| U.S. Pat. Nos. | Inventor(s) |
| --- | --- |
| 4,910,661 | Barth et al |
| 4,966,537 | Bowles et al |
| 5,361,946 | Ginther et al |
| 5,464,124 | Weyh et al |
| 5,816,450 | Alexander et al |

The Bowles et al, Ginther et al, Weyh et al and Alexander et al patents relate to various forms of hand-held dispensing apparatuses for dispensing icing on cakes and the like. Alexander et al relates to a pneumatic frosting applicator and Ginther et al relates to an icing dispenser of a caulking gun variety.

Barth et al discloses a computerized method and apparatus for decorating cakes and other foods and discloses a cake decorator having an X, Y table and liquid spray applicators and icing or gel dispensers which are moved over the cake and controls the application of food coloring and icing or a gel in computer selected patterns on the cake.

Kitos U.S. Pat. No. 5,505,775 relates to a cake decorating system in which a computer controls the dispensing of a multiple orifice drop on demand colorant expulsion system to provide three-color printing on the article being decorated.

In contrast, the present invention is predicated on the principles of hand cake-decorating, an art of great lineage, which allows the art to continue and speeds up cake decorating while removing the adverse ergonomical conditions associated with cake decorating.

The experience of many years of professional cake decorating can lead to carpel tunnel syndrome, sleepless nights with wrist aches and working with the pain. The repetitive movements of cake decorating, plus the pressure put on the hands and wrists, as well as the twisting of the elbows, has undoubtedly caused many people to forgo this endeavor, or to opt for carpel tunnel surgery, to be able to continue their profession.

The invention should eliminate this problem, and enhance the cake and pastry decorating industry. There are other positive factors of the invention, such as enhanced sanitation and less time and product waste, which would improve the cake decorating efficiency. The invention is not meant to replace people but to make their life easier and more profitable. There are other benefits not the least of which is labor costs where quantity and speed are of the essence.

Thus, a major objective of the invention is to provide an improvement in methods and apparatus for preparing and dispensing cake icing and cake and pastry decorating in general.

Another object of the invention is to provide a cake and pastry icing or decorating system and method in which the icing is dispensed from a hand-held dispensing wand by a cake and pastry decorating artisan and a base icing, typically neutral or white, is stored in a remote container under pressure and delivered to the hand-held wand under control of the artisan along with selected fluent colorants (food coloring) to a mixing chamber in the wand for dispensing various selected colors of icing by the cake artisan.

The invention also features the following:

A cake and pastry icing system for preparing and dispensing cake icing which includes a main icing storage chamber for containing a base icing under pressure and a plurality of colorant storage chambers for containing a corresponding plurality of colorants under pressure. A cake icing wand having a handle and an icing dispensing head with the icing dispensing head having a mixing chamber and an icing dispensing nozzle. A plurality of flexible tubings or passages couple the mixing chamber to the storage chambers with there being at least one passage for each of the base icing and each color valving systems are provided for controlling the flow of each of the plurality of colorants and the base icing to the passages, respectively, and a plurality of pushbutton control members in the handle selectively control the flow of base icing and one or more colorants under pressure to the mixing chamber and the icing dispensing nozzle. The wand may have one or more interchangeable cake icing nozzles, narrow, thick, wide, star-shaped icing patterns, rosettes and rose-shaping nozzles, for example.

Since the base icing may be highly viscous, in a preferred embodiment, the valving element for the base icing may include a positive displacement pump.

Further, the invention relates to a cake icing dispensing system in which a base icing container having a pneumatic piston head for pressurizing base icing in the base icing container and a plurality of colorant containers, each colorant container having a pneumatic piston head for pressurizing colorant therein. The common source of pneumatic pressure (air or $CO_2$ for example) is coupled to each of the piston heads, and a mixing and dispensing wand is connected to each container by flexible tubing for receiving base icing and selected colorant from the containers. A system of valves controls application connection of the colorants under pressure from the common source to mixing head and cause delivery of the base icing to the mixing head in the dispensing wand.

Further, the invention comprises a decorating method in which a hand-held icing wand having a mixing chamber and a dispensing nozzle and a remote supply of base icing is provided to the mixing chamber. One or more colorants is selectively supplied to the mixing chamber. The icing is dispensed from the mixing chamber through a dispensing nozzle directly onto the cake in patterns determined by the position of the hand-held mixing wand and the shape of the dispensing nozzle.

According to a further feature of the invention, a programmable microprocessor system controller can be used to provide color control signals to the colorant and base white icing valves to produce different colors at the selective option of the artisan cake decorator. For example, in one embodiment, the wand is provided with a pushbutton or touch panel which has buttons labeled with the primary colors, red, blue, yellow; and the secondary colors made from the primary colors, such as purple, made from red and blue; orange made from red and yellow; green made from blue and yellow, etc. The processor is programmed so that the control signal sent to the colorant valves are pulsed to cause the valves to issue colorant at a predetermined rate determined by the color desired. For example, by varying the number or rate of pulses sent to the blue and yellow valves, respectively, any desirable shade of green may be issued. Moreover, the white or neutral base icing can be issued without any colorant admixed therein. For the colors black and brown, the separate reservoir of black colorant and brown colorant may be incorporated in the invention. Thus, it will be appreciated that great color capability and versatility is provided as selectively desired by individual customer needs.

In another embodiment, a flow valve is provided for the white or neutral to base icing and it begins to flow only when the selected colorants have been admitted to the mixing wand.

In another aspect of the invention, the mixing wand is provided with a water cleaning line. In this embodiment, a freshwater line is provided with a valve controlled, preferably remote from the wand, to cause water to flow through the mixing chamber of the wand and thereby cleaning out the small amount of icing and any colorant that may be there. In this embodiment, the water drains out by way of gravity, and if desired, as a further clean-out feature, a blast of air or carbon dioxide from a storage source may be used to dry the wand prior to using the wand again to apply icing to a cake or other product as desired.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1A:
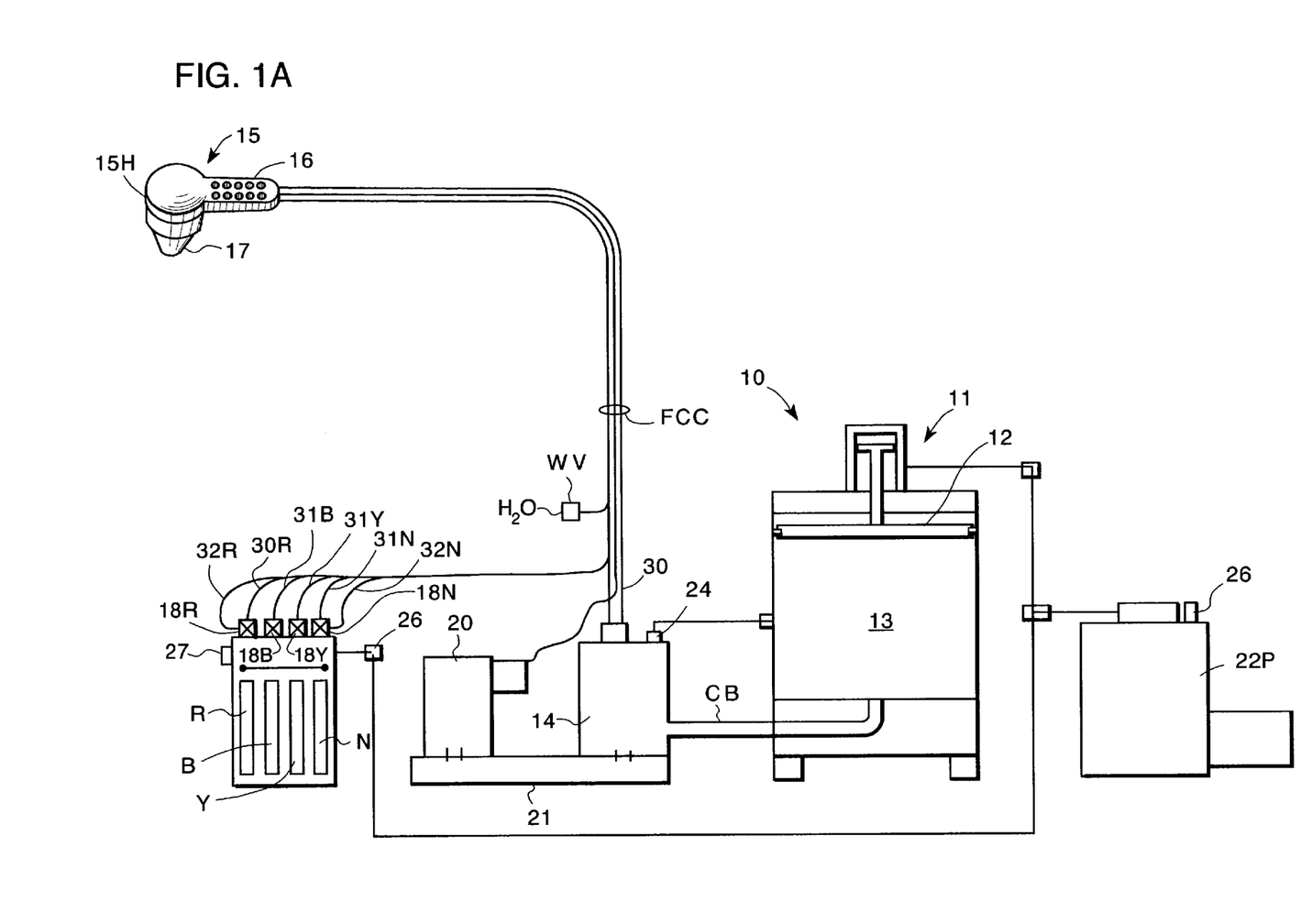
FIG. 1A is a schematic diagram of one preferred embodiment of a cake and pastry icing dispensing and mixing apparatus incorporated in the invention.
Figure 1B:
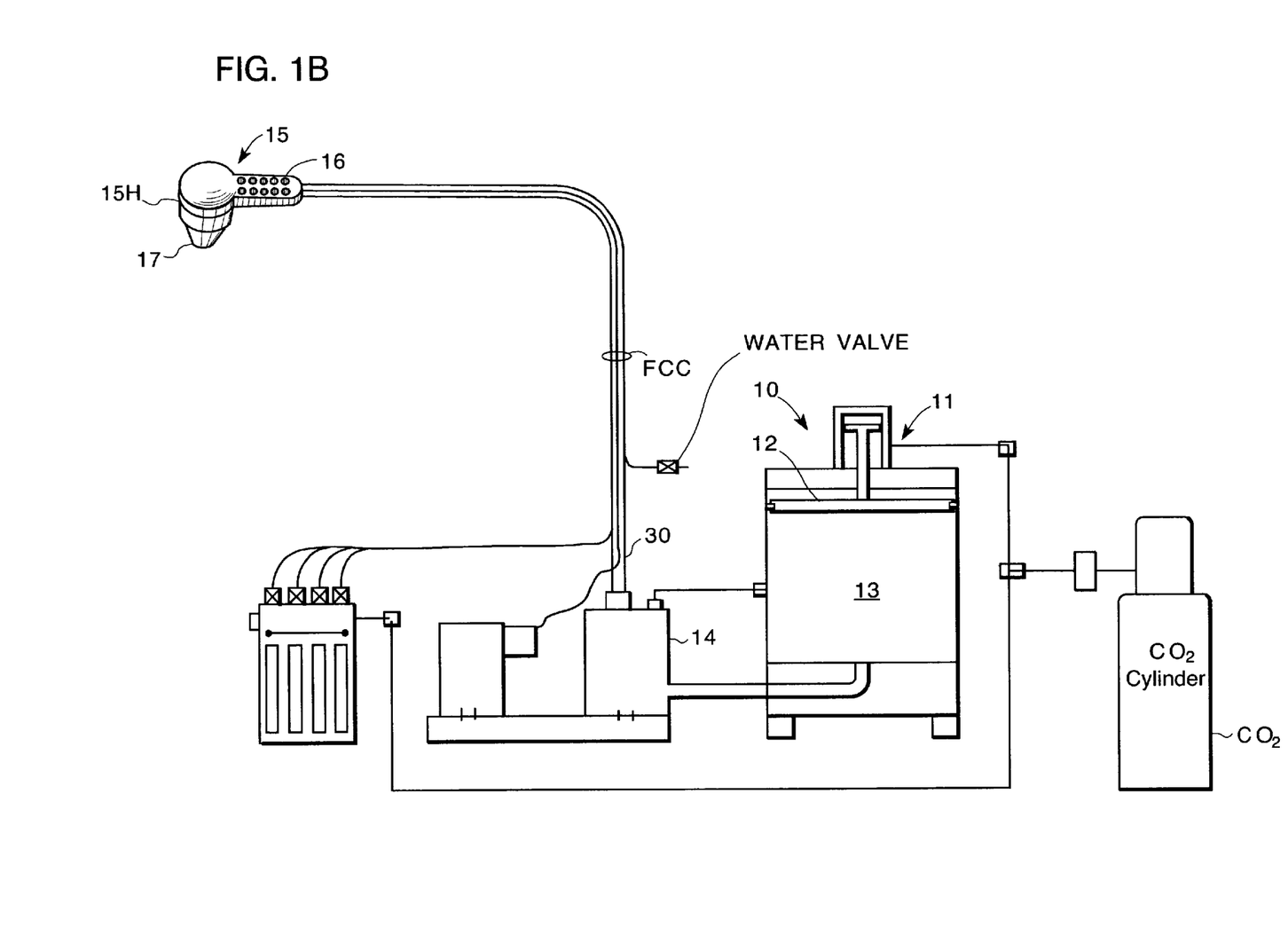
FIG. 1B is a schematic diagram of a further preferred embodiment.

Referring to FIGS. 1A and 1B, the primary components include a base icing storage vessel 10, preferably pressurized, by means of a pneumatic cylinder 11 forcing a nylon plate 12 against the upper surface of a flowable base frosting 13 (typically white icing). Since the base icing may be viscous, a positive displacement pump 14 which, when activated, forces the base frosting to a hand-held and maneuvered wand 15 and application and mixing head 15H. The application and mixing head 15H, by means of easily cleaned solid-state low-voltage electric touch pad 16, activates the primary frosting pump 14 to dispense base icing via a relatively large diameter flexible tube 30 onto the cake, which may or may not be finished with appropriate spatula. By making the appropriate settings on the touch pad 16 and installing the desired decorating nozzle 17, the decorator/operator may proceed by initiating the primary or main frosting (icing) application switch, to decorate the cake or pastry in any desirable pattern or artful concept. Of course, the base icing may be colored by selecting a colorant or pre-colored.

Flexible cover connection FCC contains the base icing tube (of relatively large diameter tubing 30 because of the higher viscosity of the base icing), color tubes 31R, 31B, 31Y . . . 31N which can be of significantly smaller diameter because these are colorants having the much lower viscosity (almost the viscosity of water) than the base icing, low voltage, 24 volt one-phase primary wiring to the electric drive motor and solenoids 18R, 18B, 18Y . . . 18N. In the preferred embodiment, only the electrical switches are in the touch panel to processor circuit 4B-10 and convey 24-volt operating signals to the solenoids via wiring 32R, 32B . . . 32N.

In FIG. 1B, the air pump for pressurizing the base icing storage vat and the colorant storage vats or reservoirs has been replaced by an air or $CO_2$ cylinder.

In connection with the coupling CB of the base icing from the base icing storage vessel 13 to the positive displacement pump 14.

The colors (colorants) are driven or conveyed under pressure, through solenoid valves 18R, 18B, 18Y . . . 18N and appropriate orifices, through respective flexible hoses, 31R, 31B, 31Y . . . 31N to the dispensing head 15H. The low-voltage touch pad 16 controls the solenoid valves and hence primary colors and the mix of colors, which are then mixed with the base icing by a rotating mixing assembly (FIGS. 2 or 3) in dispensing wand 15, thence, dispensed onto the cake or pastry under the artistic control of the professional.

Figure 4A:
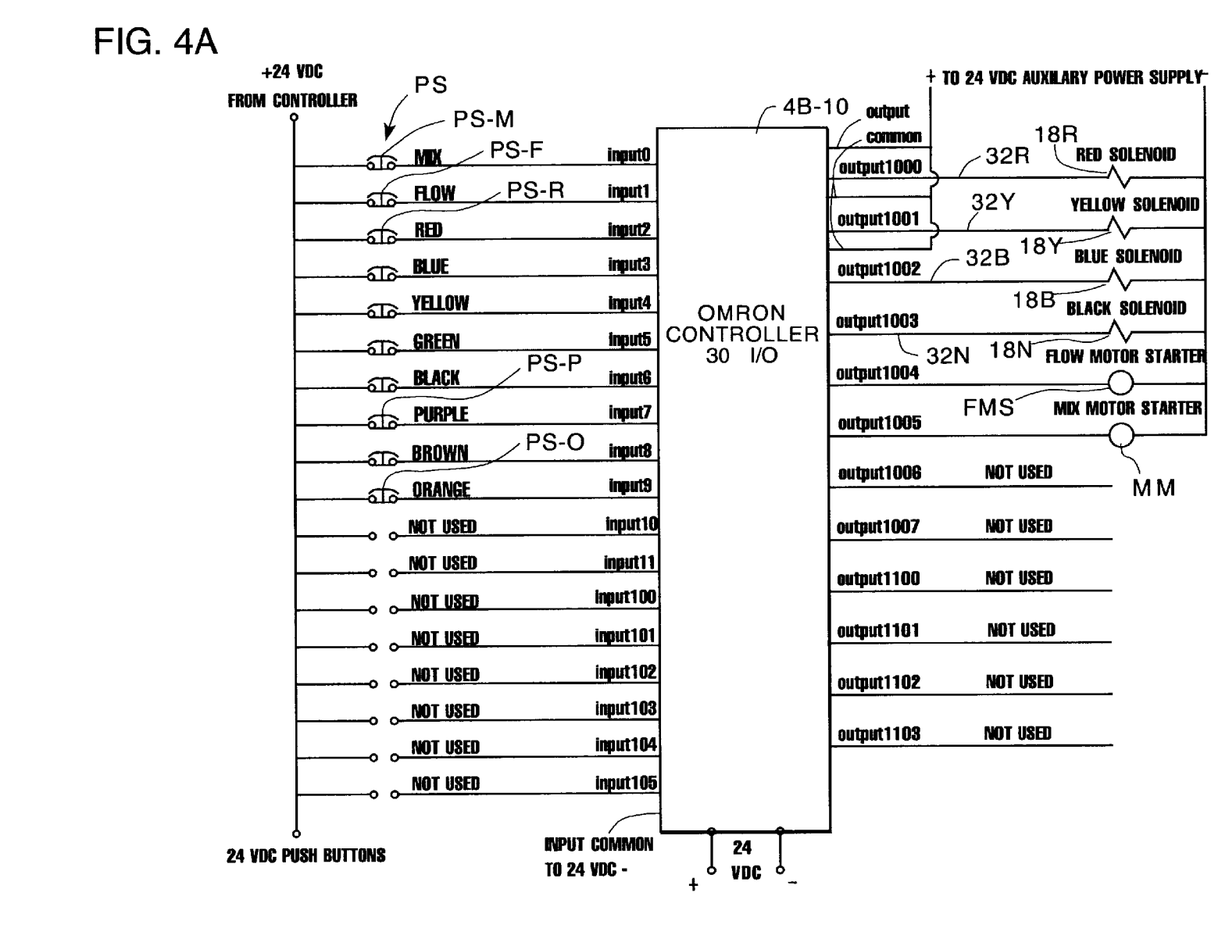
FIG. 4A is an electrical circuit diagram of one embodiment of the invention.

The primary frosting pump 14 is controlled by flow motor starter FMS (FIG. 4) preferably made of nylon lobes driven by fractional horse power 115V electric motor 20 by means of gear reduction 21 to further reduce the speed of the pump.

Protective devices on the device include:

(2) Pressure relief valves 22 on air supply, "oilless air pump" 22P.

(1) Pressure relief valve 23 on pressure vessel.

(1) Pressure relief valve 24 on discharge side of positive displacement pump 14.

(1) High pressure switch 25 with setting below P.R.V. on pump. Switch opens on high pressure and closes to restart pump on activation of primary frosting control on touch pad.

(1) Constant pressure reducing valve 26 on color vat.

(1) Pressure relief valve 27 on color vat.

Base icing under pressure to dispensing head is supplied by positive displacement lobe pump 14. Alternatively, a screw pump may be used for this operation. Base icing is supplied to pump 14 from the pressurized reservoir or vat 10 under low pressure.

Figure 2:
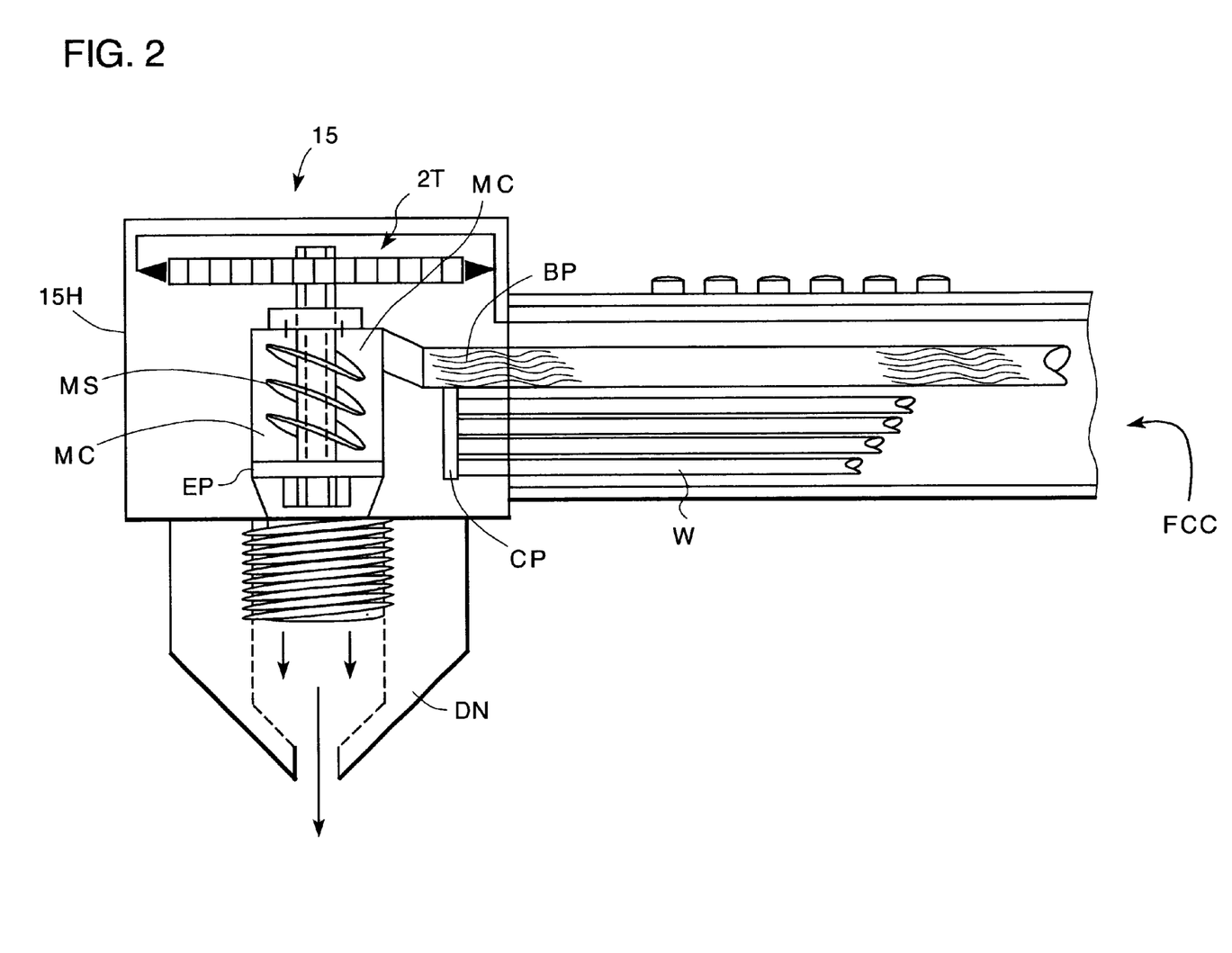
FIG. 2 is a sectional view of one embodiment of the wand showing a pneumatic drive system for the mixing chamber.
Figure 3:
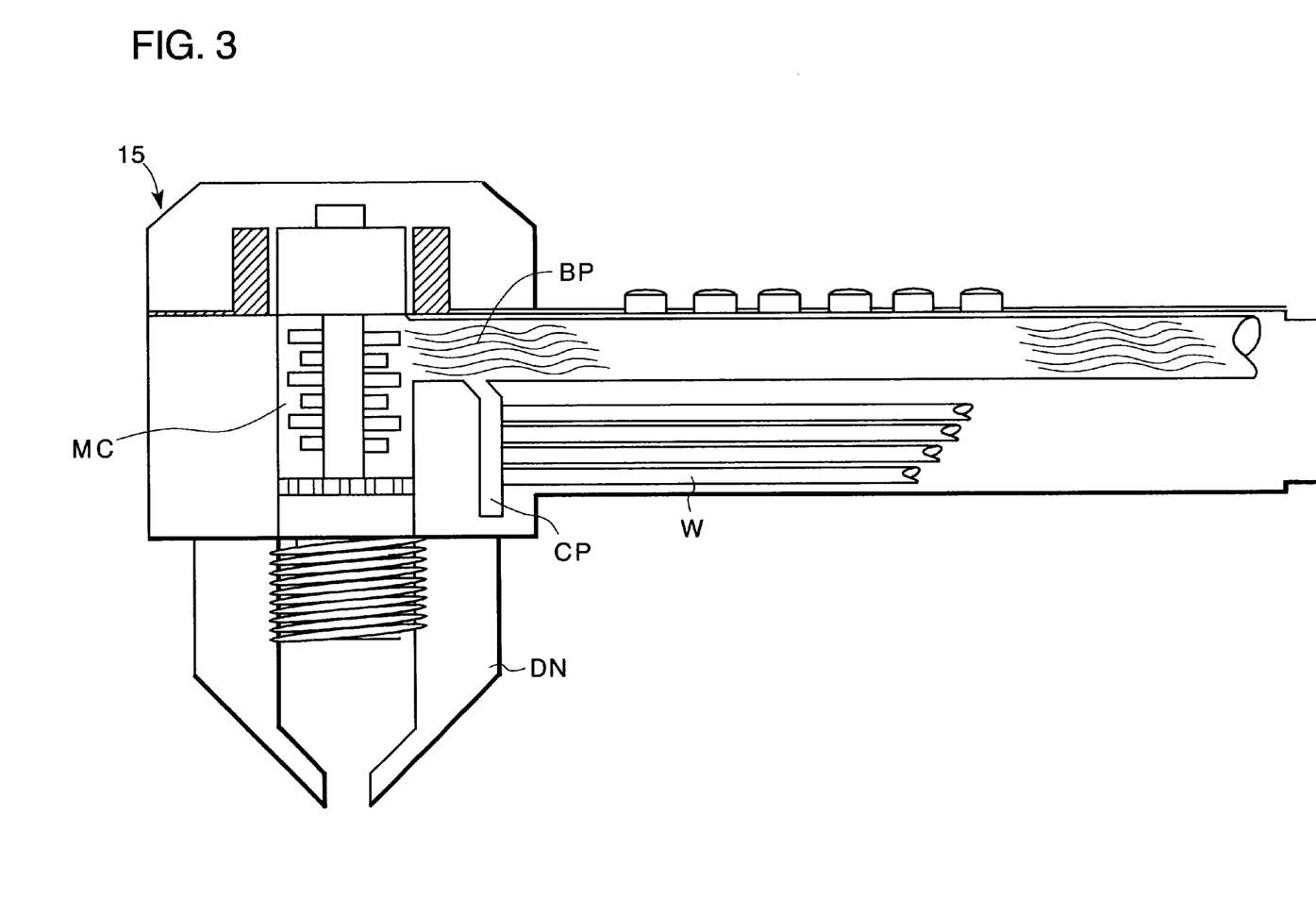
FIG. 3 is a further embodiment of the mixing wand having an electric drive motor for driving the mixing chamber.

Referring now to FIGS. 2 and 3, the flexible cable connector FCC is coupled to the hand-held mixing head and dispensing wand 15. In the embodiment shown in FIG. 2, air line or hose conveys pneumatic pressure to a turbine 2T which drives a mixing screw MS or paddle wheel (FIG. 3) in a mixing chamber MC. Colorants are fed by flexible tubing 32R, 32B, 32Y . . . 32N from the solenoid valves 18R, 18B, 18Y . . . 18N via the flexible tubing to a colorant passage LP which joins with the base icing mix passage BP where there is some mixing prior to entering the mixing chamber MC to be mixed by mixing screw MS (or the mixing paddles MP in FIG. 3). The mixing screw MS or blades or elements are rotated at a speed to assure sufficient mixing of the base icing with the colorant to achieve the color desired. The mixed icing is extruded through a plate EP at the base of the mixing chamber MC into a dispensing nozzle DN which is screw-fitted so that it may be changed to accommodate any configuration of icing nozzle known in the art.

In this embodiment, the lowermost tubing is designated W for the feed of cleaning water into the bottom of colorant passage CP and is used to flush the mixing head of any colored icing. Preferably, the water valve WV is located remote from the wand to avoid accidental operation thereof. The system is adaptable to include a blast of air or $CO_2$ to dispel out any water than may be in the mixing head 15.

In the embodiment shown in FIG. 3, an electric motor EM is shown as driving a set of paddle wheels PW for assuring adequate mixing of colorant and base icing mix.

Figure 4B:
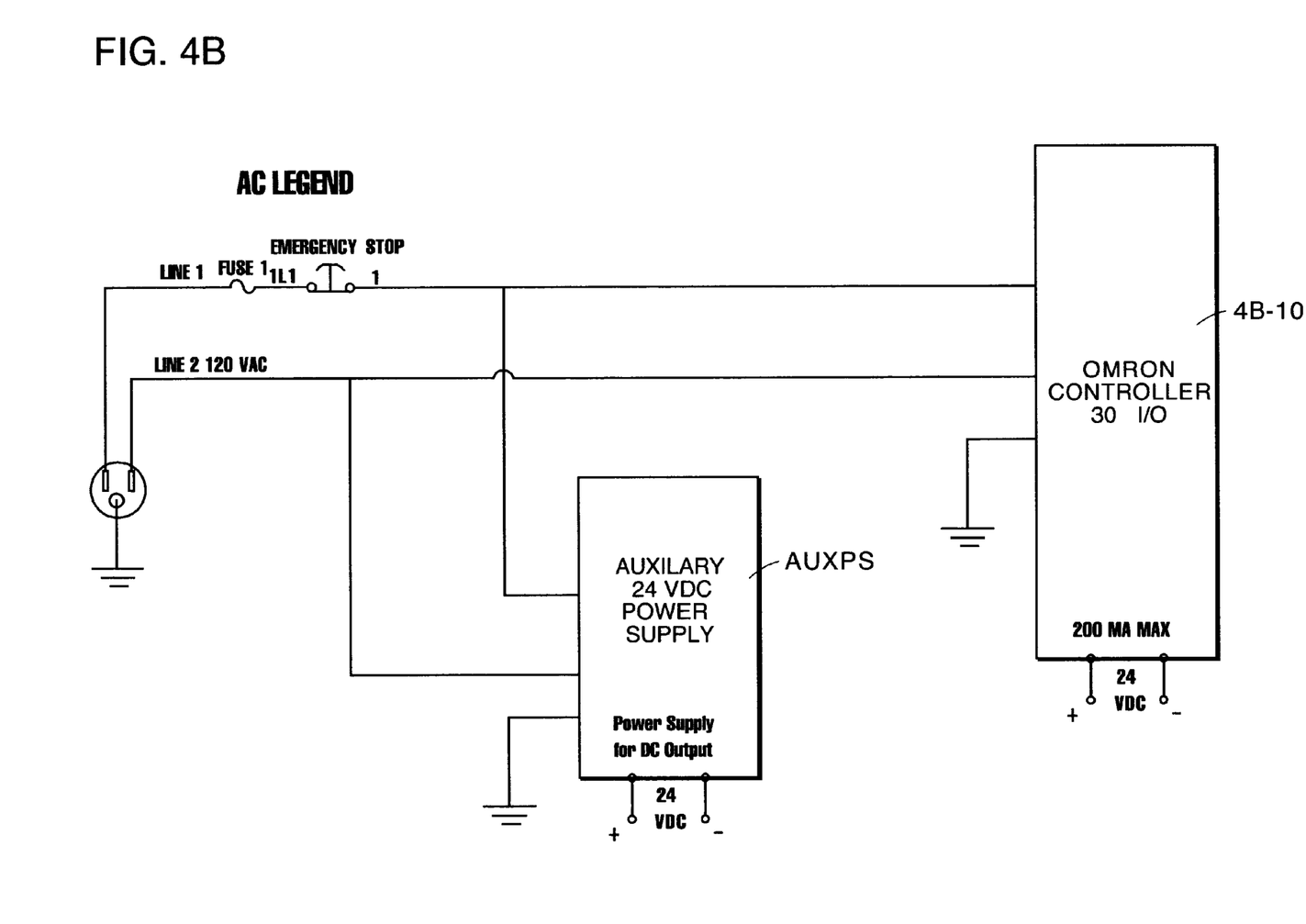
FIG. 4B is a block diagram of the power supply.

Referring to FIGS. 4A and 4B, the electrical schematic diagram is shown. In FIG. 4B, a 115–120 volt supply is shown as being supplied through a fuse or circuit breaker and emergency stop to an auxiliary 24-volt supply AUX PS inverter which provides a 24-volt output for supplying the microprocessor 4B-10 (OMRON controller shown in FIG. 4A). Referring now to FIG. 4A, the switches are pushbutton switches PS-M, PS-F, PS-R . . . PS-O in the control panel CP of the wand is supplied with 24 volts from the 24-volt power supply and has one input going into the OMRON controller 4B-10 (which can incorporate a microprocessor or computer) which is programmed to output solenoid control signals and motor starter control signals. For example, the "mix" switch PS-F controls the start of the mixer motor and the flow switch controls the flow of basic icing by controlling the solenoid on the positive displacement motor 20. The "mix" motor starter MM starts the mixer motor in the wand. The computer is programmed so that when, for example, the "purple" switch button PS-P is depressed, a combination of blue and red pulsing signals are sent to blue and red solenoids (18B and 18R)according to the degree of purple desired. When the "orange" button PS-O is pressed, the computer controller 4B-10 causes the pulsing of the red and yellow solenoid valves so that red and yellow are combined to produce orange. Black may be supplied as a separate colorant.

Figure 5:
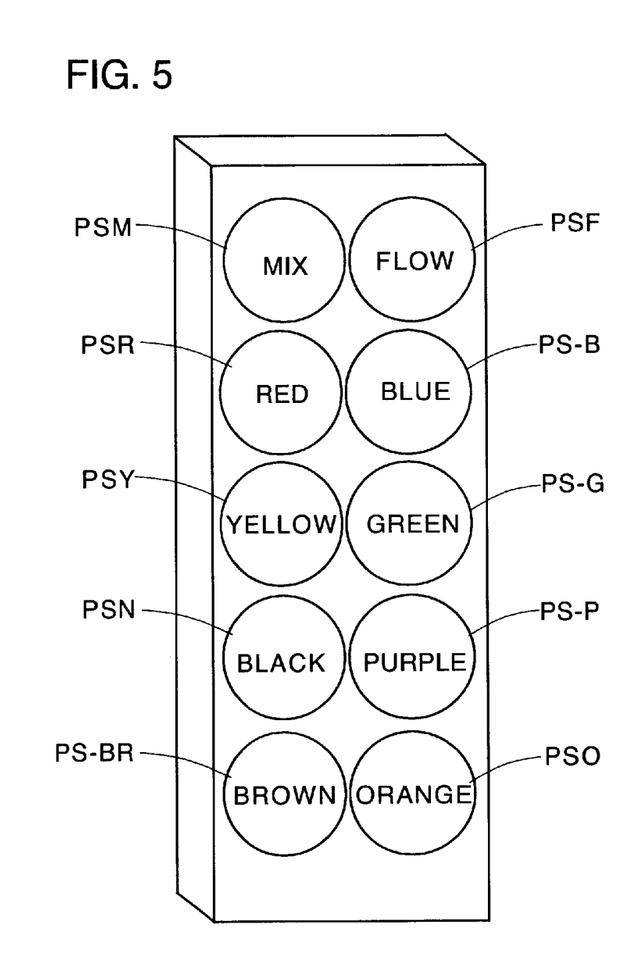
FIG. 5 is a pictorial illustration of one pushbutton control panel useful in practicing the invention.
Figure 6:
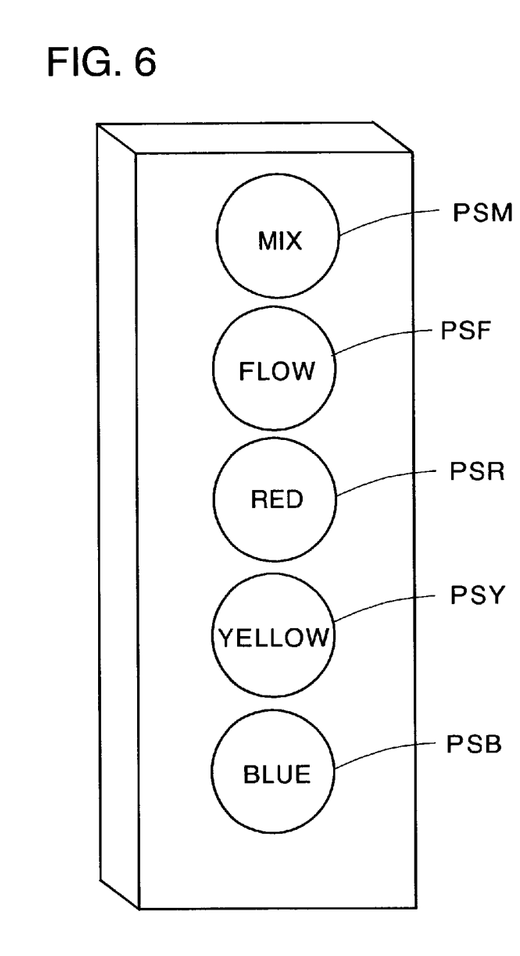
FIG. 6 is a pictorial illustration of another pushbutton control panel and useful in practicing the invention.

Referring to FIGS. 5 and 6, several arrangements of the control panel or pushbutton panel 16 are illustrated. In this embodiment, the "mix" and "flow" buttons are first and the different colors selectable in this suggested embodiment are illustrated as red, blue, yellow, green, black, purple, brown and orange. For the black and brown colors, the colorant storage vessels may contain colorants of the black and brown individually.

In the touch panel arrangement shown in FIG. 6, five control buttons are illustrated and only five of the control switches shown in FIG. 4A would be used. The circuit illustrated in FIG. 4A is adaptable to any number of colors, and the controller (OMRON 30-I/O) is likewise adapted to this function. As shown in FIG. 4B, the OMRON controller can be run by either 115V or 24V off of the auxiliary power supply AUX PS.

The dispensing head 15 (shown in detail in FIGS. 2 and 3), which is made up of a control touch pad 16 and handle 17, mixing chamber, rotating mixing assembly, and dispensing nozzles which include an adapter for basic nozzles which are the same as uses for manual bag application.

The dispensing head is attached by a flexible hose assembly which, in this embodiment, contains:

1. ¼" I.D., an air line to drive mixing device in head (in the FIG. 2 head embodiment).
2. 6 (more or less depending on the number and degree of color flexibility desired), ⅛" I.D. hoses to feed colors from color vat.
3. ½", hose to carry base icing from pump to head.

For ease of cleaning and sanitation purposes, this flexible hose assembly is covered with light gauge spiral stainless steel.

Figure 1C:
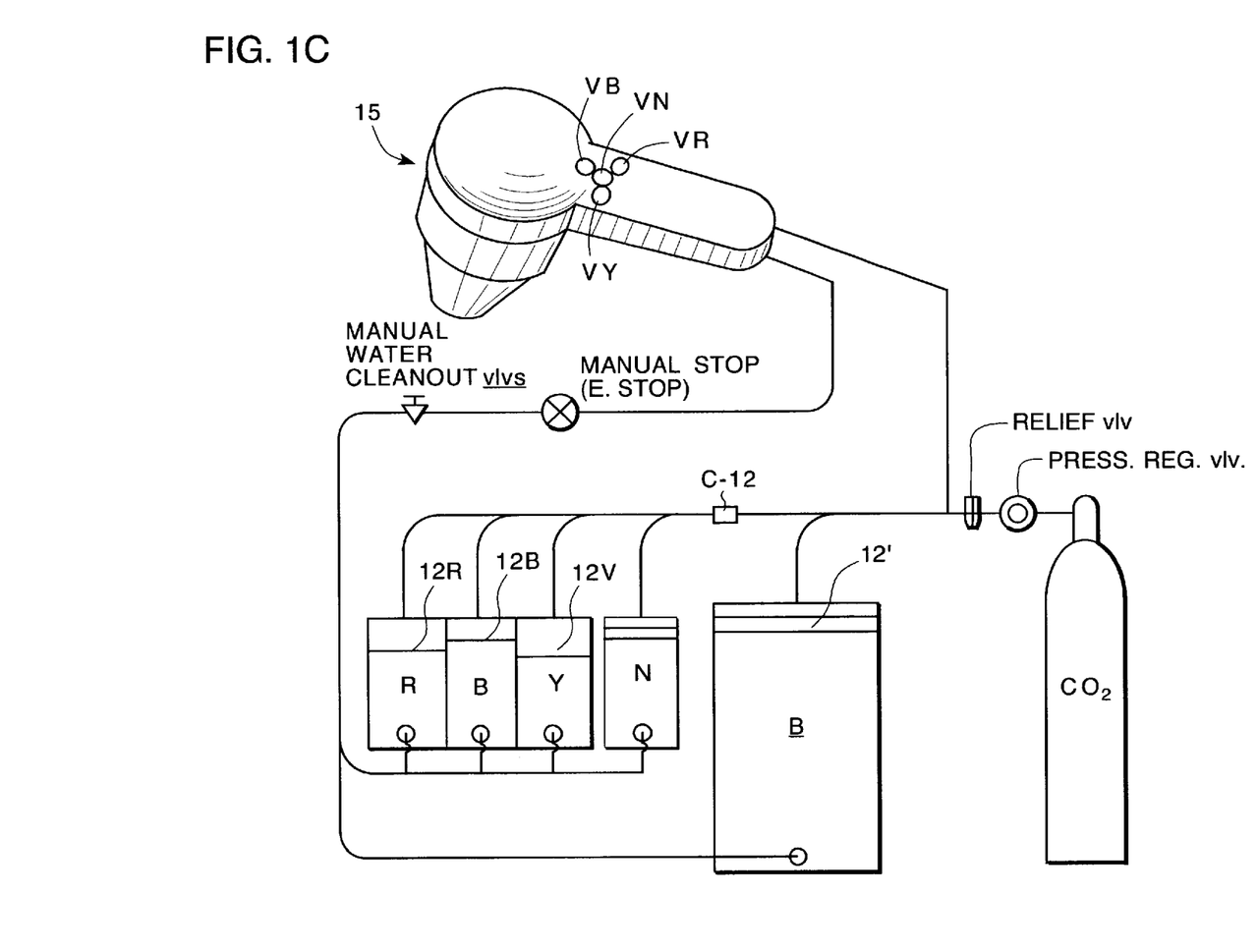
FIG. 1C is a schematic diagram is a further simplified embodiment of the invention.

Referring to FIG. 1C, an all pneumatic system is disclosed in this case, pressure from a $CO_2$ tank C-10 has facets or pressure reducer C-11 to pressure-reducer C-12 which supplies pressure to the pistons in the individual colorant storage vessels R, B, Y . . . N. Colorant is fed from the bottom of the colorant storage vessels or reservoirs R, B, Y . . . N via flexible tubing FT to the mixing and dispensing wand 15' where manually actuated valve VOW controls flow of the base icing and air to the mix motor, and valves VR, VB, VY control flow of red, blue and yellow colorants. In this embodiment, the base frosting is tailored to have a lower viscosity and the mixing head 15H is pneumatically driven by $CO_2$ from the $CO_2$ storage vessel which is actuated upon actuation of valve VOW. The valve buttons are shaped and located so that a thumb can actuate the flow valve VOW and any two colorant valves.

This device will save time, money and labor while allowing the continuing art form and will only enhance the finished product.

Secondarily, operators will benefit by the ergonomical design of the dispensing handle which will be less stressful on the wrist (carpal area).

Total clean-up of the base icing container, the hose, pump and dispensing head is easily accomplished with warm to hot water through the base icing pressure vessel. A clean water line 30 is controlled by a hand valve.

Multiple pressure vessels may be integrated into the system as demand requires.

An optional method of introduction of base icing to the pump can be by way of icing being supplied directly from five-gallon or larger containers.

The size of the machine is constructed to enable the installation of all working parts and containers, beneath a utility table of the approximate size and construction of existing tables for this purpose. The OMRON controller may be located on the frame of the utility table.

Remote storage of containers larger than five-gallon or multiple containers may be placed in remote locations and fed to the primary icing pump through 1" fixed or flexible hose.

An optional manifold fitted to intake of the pump to facilitate integration of multiple pressure vessels.

Attachment for holding dispensing nozzle may be fitted to worktable by simple clamp and screw method, to permit movement of attachment to any location on a table. Attachment for holding the mixing and dispensing nozzle may be fitted to worktable permanently with track to permit movement from one end of table to opposite end, or from one side of table to opposite side. Both attachments can be fitted with trays to hold various decorating nozzles.

Where product cost is a consideration, this device will save 20% or more over manual bag mixing methods where overmix is discarded. Sanitation is sacrificed in manual decorating when mixed icing is returned to the containers for later use. This device which may be cleaned and sanitized completely, holds products in a sanitary totally enclosed environment.

While the invention has been described in relation to preferred embodiments of the invention, it will be appreciated that other embodiments, adaptations and modifications of the invention will be apparent to those skilled in the art.

What is claimed is:

1. A cake and pastry decorating system comprising:
    a base icing supply,
    at least one colorant supply,
    a hand-held ice mixing wand having a mixing chamber and a dispensing nozzle and a control panel,
    a plurality of valve elements for controlling the flow base icing and colorant from said supplies to said hand-held mixing wand, and
    a plurality of electrical selection switches in said hand-held mixing wand electrically connected to said valve elements for selectively controlling said valve elements to supply base icing to said mixing wand and one or more colorants depending on the desired color of icing to be dispensed by said dispensing nozzle.

2. The cake decorating system defined in claim 1 wherein said valve element for controlling flow of base icing from said base icing supply to said hand-held wand is a positive displacement pump.

3. The cake decorating system defined in claim 2 wherein said positive displacement pump is driven by an electric motor through a gear reduction mechanism.

4. The cake decorating system defined in claim 1 including a supply of flushing liquid under pressure and a further valve controlling the supply of said flushing liquid under pressure to said mixing head for cleaning of same.

5. The cake decorating system defined in claim 4 wherein said base icing is put under pressure from a source of carbon dioxide ($CO_2$).

6. The cake decorating system defined in claim 4 wherein said base icing and said colorants are placed under pressure from a common source of fluid pressure.

7. The cake decorating system defined in claim 4 wherein said hand-held mixing and dispensing head or wand is connected to said base icing pressure supply and said colorants by a flexible hose casement and electrical control wiring cable.

8. The cake icing decorating system defined in claim 1 including a microprocessor for sending signals to a valve element controlling said colorant for pulsing said valve element controlling said colorant at a rate determined by the color desired from said mixing head.

9. The cake decorating system defined in claim 1 wherein said hand-held mixing wand and dispensing head has a mixing assembly for mixing said at least one colorant with said base icing and dispensing same through said nozzle, said mixing head having a mixing chamber with mixing elements therein and a mixing motor for driving said mixing elements.

10. The cake decorating system defined in claim 9 wherein said mixing motor is driven by air.

11. The cake decorating system defined in claim 9 wherein said motor is driven by the low-voltage electric motor.

12. The cake decorating system defined in claim 1 wherein said colorants include at least supplies of the base primary colors, red, blue and yellow, and said base icing is white.

13. The cake decorating system defined in claim 12 wherein said common fluid is selected from air and $CO_2$.

14. The cake decorating system defined in claim 1 wherein said supplies are under pneumatic pressure.

15. The cake decorating system defined in claim 1 wherein a microprocessor is connected between said selection switches and functions to combine colors to produce a secondary color and admixes said secondary color with base icing to produce the icing color dispensed by said nozzle.

16. A cake and pastry decorating system comprising:
    a base icing reservoir under pressure,
    a plurality of colorant reservoirs under pressure, respectively,
    a hand-held icing mixing wand having a mixing chamber and a dispensing nozzle,
    a plurality of flexible passages coupling said reservoirs to said mixing wand, respectively,
    a plurality of valve elements for controlling the flow base icing and colorants from said reservoir to said hand-held mixing wand, and
    a corresponding plurality of valve operators in said hand-held mixing wand for selectively controlling said valves to supply base icing to said mixing wand and one or more colorants depending on the desired color of icing to be dispensed by said dispensing nozzle.

17. A cake icing system for preparing and dispensing cake icing comprising:
    a main icing storage chamber for containing a base icing under pressure,
    a plurality of colorant storage chambers for containing a corresponding plurality of colorants under pressure,
    a cake icing wand, said cake icing wand having a handle and an icing dispensing head,
    said icing dispensing head having
        a mixing chamber and an icing dispensing nozzle,
        a plurality of flexible passages coupling said mixing chamber to said storage chambers, there being at least one passage for each said base icing and each colorant,
        a valve for controlling flow in each of said plurality of said passages, respectively,
        a plurality of control members in said handle, one for each valve for controlling flow of base icing and colorant under pressure to said mixing chamber and said icing dispensing nozzle.

18. A cake icing dispensing system comprising:
    a base icing container having a pneumatic piston head for pressurizing base icing in said base icing container,
    a plurality of colorant containers, each colorant container having a pneumatic piston head for pressurizing colorant therein, respectively,
    a common source of pneumatic pressure coupled to each said pneumatic piston head,
    a mixing and dispensing wand connected to each said container for receiving base icing and colorant from said containers, and
    a system of valving to cause delivery of said base icing to said mixing and dispensing wand and selective delivery of colorant to said mixing and dispensing wand.

19. A cake decorating method comprising:

providing a hand-held icing mixing wand having a mixing chamber and a dispensing nozzle, supplying base icing to said mixing chamber, selectively supplying one or more colorants to said mixing chamber, and dispensing icing from said mixing chamber through said dispensing nozzle directly on said cake in patterns determined by the position of said hand-held icing mixing wand and shape of said dispensing nozzle.

* * * * *